United States Patent
Marks et al.

(10) Patent No.: US 7,402,102 B2
(45) Date of Patent: Jul. 22, 2008

(54) GAMING DEVICE HAVING MULTIPLE SYMBOLS AT A SINGLE SYMBOL POSITION

(75) Inventors: Howard Marks, Irnington, NY (US); Anthony M. Singer, Ringwood, NJ (US); Daniel Marks, Nyack, NY (US)

(73) Assignee: IGT, Reno, NV (US)

( * ) Notice: Subject to any disclaimer, the term of this patent is extended or adjusted under 35 U.S.C. 154(b) by 572 days.

(21) Appl. No.: 10/650,247

(22) Filed: Aug. 28, 2003

(65) Prior Publication Data

US 2004/0058727 A1 Mar. 25, 2004

Related U.S. Application Data

(60) Provisional application No. 60/412,012, filed on Sep. 20, 2002.

(51) Int. Cl.
- *A63F 9/24* (2006.01)
- *A63F 13/00* (2006.01)
- *G06F 17/00* (2006.01)
- *G06F 19/00* (2006.01)

(52) U.S. Cl. ............................ 463/20; 463/16; 463/17; 463/18; 463/19; 273/138.1

(58) Field of Classification Search ............. 463/16–25; 273/138.1
See application file for complete search history.

(56) References Cited

U.S. PATENT DOCUMENTS

| | | |
|---|---|---|
| 5,209,479 A | 5/1993 | Nagao et al. |
| 5,393,061 A | 2/1995 | Manship et al. |
| 5,395,111 A * | 3/1995 | Inoue ..................... 273/143 R |
| 5,449,173 A | 9/1995 | Thomas et al. |

(Continued)

FOREIGN PATENT DOCUMENTS

AU     B-74936/87     6/1987

(Continued)

OTHER PUBLICATIONS

Penguin Pays Advertisement, written by Aristocrat Incorporated, published in 1998.

(Continued)

*Primary Examiner*—Xuan M. Thai
*Assistant Examiner*—Meagan Thomasson
(74) *Attorney, Agent, or Firm*—Bell, Boyd & Lloyd LLP

(57) ABSTRACT

A gaming device including a plurality of reels having a plurality of symbols including at least one replicator symbol. The replicator symbol includes at least two of the same symbols in a single symbol position on the reels. The replicator symbol may include any suitable number of the same symbols. The replicator symbol thereby increases the likelihood that a player will obtain a winning symbol combination on the reels and also an award in a game. In one embodiment, a winning symbol combination includes at least one replicator symbol and at least one other symbol at a plurality of symbol positions on a payline associated with the reels. In another embodiment, the winning symbol combination at least one replicator symbol and at least one other symbol at a plurality of symbol position in at least one symbol position on a plurality of paylines associated with the reels.

29 Claims, 11 Drawing Sheets

U.S. PATENT DOCUMENTS

| | | | |
|---|---|---|---|
| 5,611,535 A | 3/1997 | Tiberio | |
| 5,752,881 A | 5/1998 | Inoue | |
| 5,769,716 A | 6/1998 | Saffari et al. | |
| 5,890,962 A * | 4/1999 | Takemoto | 463/20 |
| 5,980,384 A * | 11/1999 | Barrie | 463/16 |
| 5,997,401 A | 12/1999 | Crawford | |
| 6,027,115 A | 2/2000 | Griswold et al. | |
| 6,033,307 A | 3/2000 | Vancura | |
| 6,056,642 A | 5/2000 | Bennett | |
| 6,059,289 A | 5/2000 | Vancura | |
| 6,095,921 A | 8/2000 | Walker et al. | |
| 6,120,378 A | 9/2000 | Moody | |
| 6,165,070 A | 12/2000 | Nolte et al. | |
| 6,190,254 B1 * | 2/2001 | Bennett | 463/13 |
| 6,220,959 B1 | 4/2001 | Holmes, Jr. et al. | |
| 6,270,411 B1 | 8/2001 | Gura et al. | |
| 6,311,976 B1 | 11/2001 | Yoseloff et al. | |
| 6,315,660 B1 | 11/2001 | DeMar et al. | |
| 6,364,766 B1 | 4/2002 | Anderson et al. | |
| 6,439,993 B1 | 8/2002 | O'Halloran | |
| 6,551,187 B1 | 4/2003 | Jaffe | |
| 6,561,900 B1 | 5/2003 | Baerlocher et al. | |
| 6,616,142 B2 | 9/2003 | Adams | |
| 6,857,958 B2 * | 2/2005 | Osawa | 463/20 |
| 6,866,583 B2 * | 3/2005 | Glavich et al. | 463/20 |
| 6,905,406 B2 * | 6/2005 | Kaminkow et al. | 463/20 |
| 2002/0094857 A1 | 7/2002 | Meyer | |
| 2004/0009803 A1 | 1/2004 | Bennett et al. | |
| 2004/0023714 A1 | 2/2004 | Asdale | |

FOREIGN PATENT DOCUMENTS

| | | |
|---|---|---|
| AU | 199717601 B2 | 9/1997 |
| EP | 0060019 | 9/1982 |
| EP | 0410789 A2 | 7/1990 |
| EP | 0410789 A3 | 7/1990 |
| EP | 0984408 A2 | 3/2000 |
| EP | 1205984 A2 | 10/2001 |
| WO | WO00/66235 | 11/2000 |
| WO | WO00/76606 A1 | 12/2000 |

OTHER PUBLICATIONS

Wild Streak Advertisement, written by WMS Gaming, Inc., published in 2001.

Reel Magic™ Gaming Machine Description, written by IGT, available in 1986.

Slot Machines Article, by Marshall Fey, published 1983, 1989, 1991, 1994 and 1997.

Enchanted Unicorn Advertisement, written by IGT, published in 2001.

* cited by examiner

| SYMBOL COMBINATION | AWARD |
|---|---|
| A-A-A-A-A-A-A-A-A-A-A-A-A-A | 10,000 |
| A-A-A-A-A-A-A-A-A-A-A-A-A | 5,000 |
| A-A-A-A-A-A-A-A-A-A-A-A | 2,500 |
| A-A-A-A-A-A-A-A-A-A-A | 1,000 |
| A-A-A-A-A-A-A-A-A-A | 750 |
| A-A-A-A-A-A-A-A-A | 500 |
| A-A-A-A-A-A-A-A | 400 |
| A-A-A-A-A-A-A | 300 |
| A-A-A-A-A-A | 150 |
| A-A-A-A-A | 100 |
| A-A-A-A-A | 75 |
| A-A-A-A | 50 |
| A-A-A | 25 |

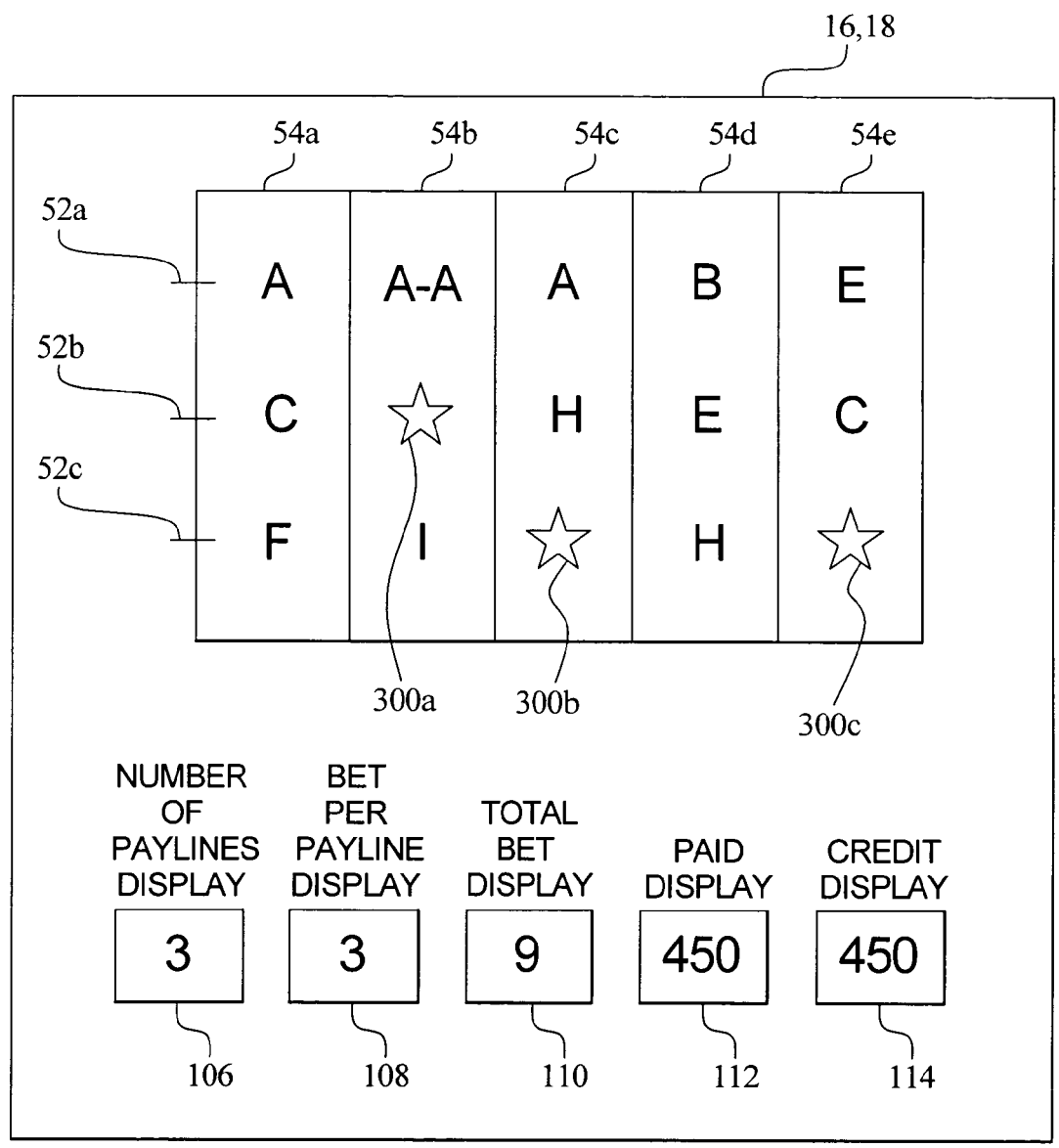

GAMING DEVICE HAVING MULTIPLE SYMBOLS AT A SINGLE SYMBOL POSITION

PRIORITY CLAIM

This application is a non-provisional patent application of and which claims the benefit of U.S. Provisional Patent Application Ser. No. 60/412,012 filed Sep. 20, 2002.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND OF THE INVENTION

To play a conventional slot machine, a player deposits money in the form of coins, gaming tokens or paper currency either into a coin head or bill acceptor. The coins and gaming tokens are collected in a reservoir inside the gaming machine while the paper currency is collected in the bill acceptor inside the gaming machine. If the coins, gaming tokens or paper currency are validated as authentic, the player accrues the appropriate number of playing credits on a credit meter. For example, a twenty-five cent gaming machine will accrue four credits for each dollar deposited into the gaming machine.

After accruing credits on the credit meter, the player determines how many credits to wager on the next spin of the slot reels. The gaming device or player then spins the reels by pressing the spin button or by pulling a handle. When the reels stop spinning, symbols are displayed and the player collects credits for winning combinations of symbols on the reels, if any, according to a pay table.

Specifically, slot machines include a symbol matrix which includes symbols displayed on three or more of the reels (also called "columns" or "reel columns") that are adjacent to each other. The resulting matrix of symbols typically ranges from three columns by three rows with nine total symbols, to five columns by three rows with fifteen total symbols. Each position in the symbol matrix is referenced by column, from left to right, and row, from the top to bottom ("symbol positions"). For example: symbol position 1/2 is located in column 1 and row 2.

Players collect credits for predetermined winning symbol combinations that appear in specific or designated symbol positions (i.e, "pay lines") on the reels. Winning symbol combinations typically require that three or more of the same symbols appear adjacent to each other starting from the leftmost position of a pay line (i.e., a "line pay"). In addition, players may also collect credits for winning symbol combinations that appear anywhere on a pay line (i.e., a "line scatter pay") or anywhere on the reels (i.e., a "reel scatter pay").

Credits are awarded to the player for each winning symbol combination based on a predetermined schedule or paytable. For line pays and line scatter pays, the number of credits wagered on the winning pay line multiplies the number of credits indicated by the pay table. For reel scatter pays, the total number of credits wagered multiplies the number of credits indicated by the pay table.

Following any type of win or payout (e.g., line pays, line scatter pays or reel scatter pays), a designated number of credits are added or transferred to the player's credit balance shown on the credit meter. As long as the player has credits on the credit meter, the player may continue to play the game.

Accordingly, there is a continuing need for new gaming devices which provide players with more opportunities to obtain awards in a game.

SUMMARY OF THE INVENTION

The present invention relates generally to a slot game and payout methods for a slot machine and more particularly, to a game and a payout method based upon multiple symbols in one or more symbol positions of the symbol matrix on a set of reels.

In one embodiment, the gaming device includes a game having a plurality of reels including a plurality of symbol positions or locations on the reels. The symbol positions or locations are positions or areas on the reels where the symbols are displayed to a player. Typically, in conventional gaming devices, a reel-type game includes a plurality of reels having symbols where one symbol is displayed in each symbol position on the reels. The present invention includes at least one and preferably, a plurality of symbols having at least one replicator or split symbol. The replicator symbol displays at least two of the same or identical symbols in a single symbol position on the reels. For example, when a replicator symbol is indicated in a symbol position on the reels, the replicator symbol may display two identical symbols, three identical symbols or any suitable number of identical symbols desired by the game implementor in a single symbol position. Therefore, contrary to conventional reel-type games, the replicator symbol of the present invention enables the gaming device to display more symbols on the reels and thereby enhances the probability that a winning combination of symbols will occur on the reels. This increases the player's excitement and enjoyment of the game because the player has a better opportunity to obtain a winning combination of symbols and thereby a better opportunity to obtain an award in the game.

In one embodiment, a winning symbol combination includes symbols indicated in at least one symbol position on a payline associated with the reels. In another embodiment, a winning symbol combination includes symbols indicated in at least one symbol position on a plurality of paylines associated with the reels. In a further embodiment, a winning symbol combination includes symbols indicated in at least one symbol position on any of the paylines associated with the reels. It should be appreciated that a winning symbol combination may be indicated in any symbol position or symbol positions on the reels.

In one embodiment, the present invention includes replicator symbols that display at least two identical symbols to a player in any single symbol position on the reels. In another embodiment, the replicator symbol or replicator symbols are only indicated in a designated symbol position or symbol positions on the reels. It should be appreciated that the replicator symbol or replicator symbols may be indicated in one, a plurality or all of the symbol positions on the reels. It should also be appreciated that the replicator symbols may display the same or identical symbols or at least one different symbol in a symbol position on the reels.

In another embodiment, the symbols include at least one bonus symbol. The gaming device provides a bonus outcome to the player for a winning combination of bonus symbols where the winning combination includes at least two bonus symbols indicated in at least one symbol position on the reels. In another embodiment, the winning symbol combination including the bonus symbols is indicated in at least one symbol position on a payline associated with the reels. In a further embodiment, the winning symbol combination including the bonus symbol is indicated in at least one symbol position on a plurality of paylines associated with the reels. The bonus outcome may be at least one award, value, modifier such as a multiplier, free game, free spin, game element or any suitable award or outcome.

It is therefore an advantage of the present invention to provide a gaming device that increases the probability of obtaining awards in a game.

Another advantage of the present invention is to provide a gaming device that increases the probability of obtaining a relatively large award in a game.

Other objects, features and advantages of the invention will be apparent from the following detailed disclosure, taken in conjunction with the accompanying sheets of drawings, wherein like numerals refer to like parts, elements, components, steps and processes.

BRIEF DESCRIPTION OF THE DRAWINGS

FIG. 4 is a front elevation view of one of the display devices of FIGS. 1A and 1B illustrating another embodiment of the present invention where the symbols on the reels include a plurality of bonus symbols.

DETAILED DESCRIPTION OF THE INVENTION

Figure 1A:
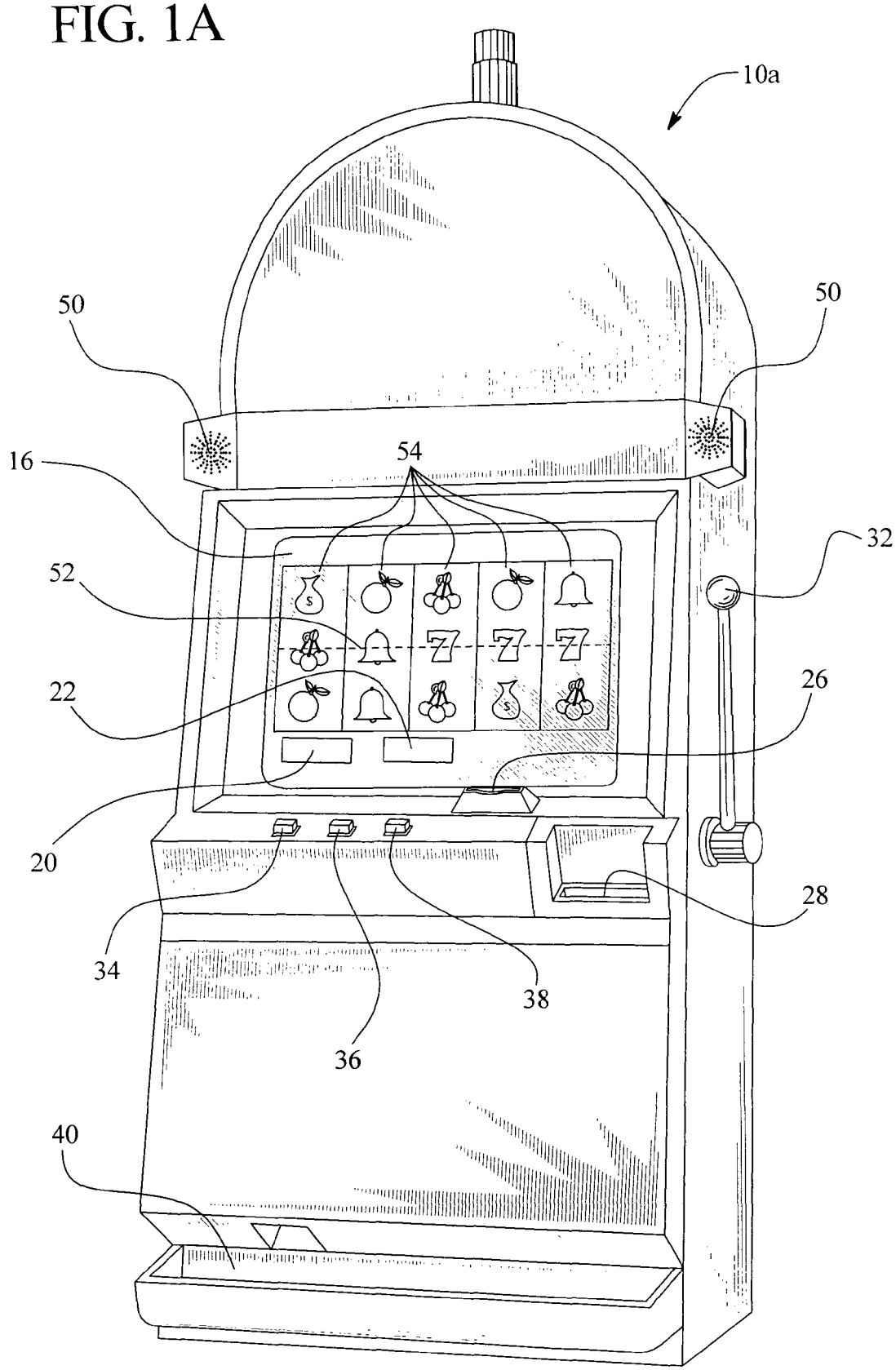
FIG. 1A is a front perspective view of one embodiment of the gaming device of the present invention.
Figure 1B:
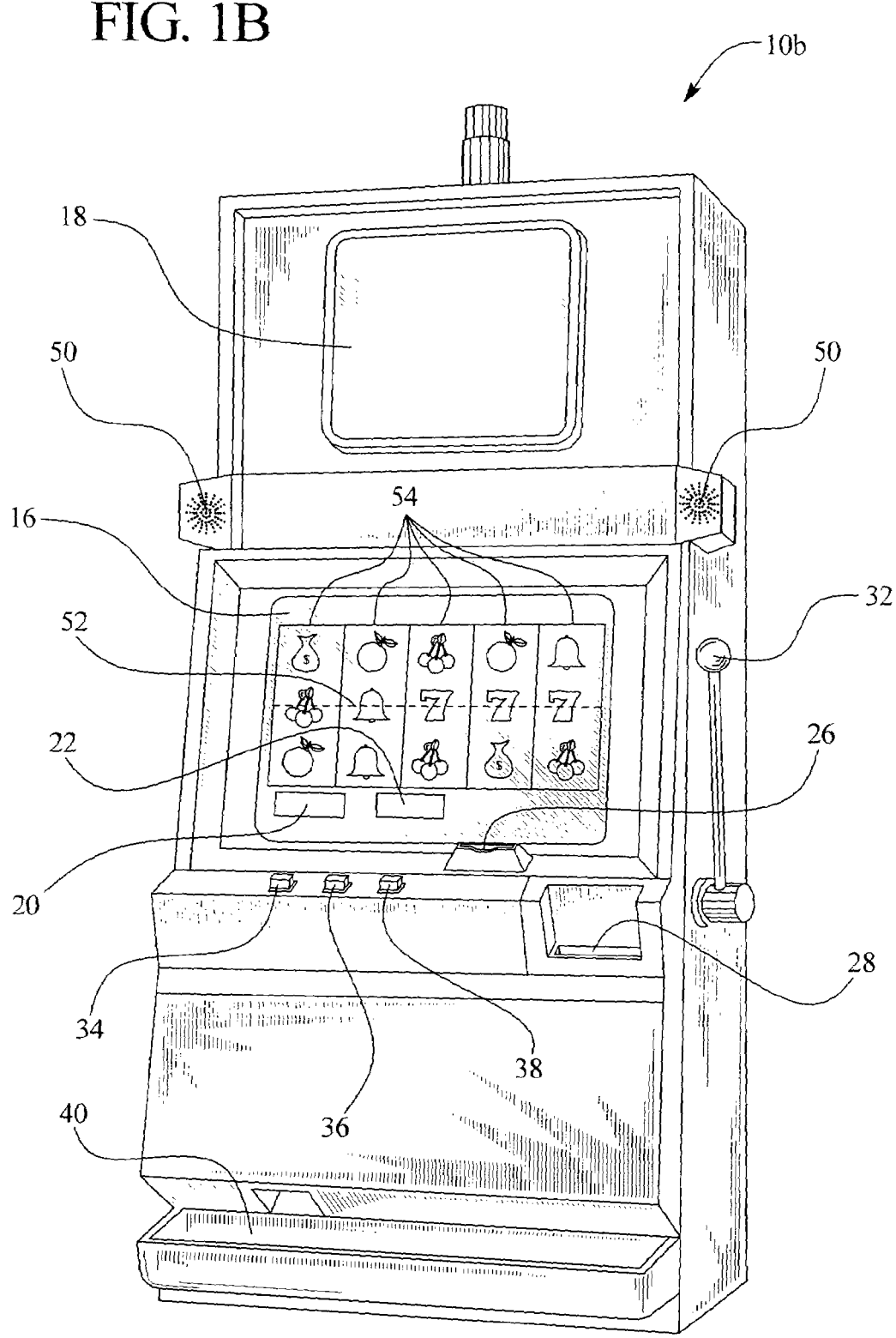
FIG. 1B is a front perspective view of another embodiment of the gaming device of the present invention.

Referring now to the drawings, two alternative embodiments of the gaming device of the present invention are illustrated in FIGS. 1A and 1B as gaming device 10*a* and gaming device 10*b*, respectively. Gaming device 10*a* and/or gaming device 10*b* are generally referred to herein as gaming device 10.

In one embodiment, as illustrated in FIGS. 1A and 1B, gaming device 10 has a support structure, housing or cabinet which provides support for a plurality of displays, inputs, controls and other features of a conventional gaming machine. It is configured so that a player can operate it while standing or sitting. The gaming device may be positioned on a base or stand or can be configured as a pub-style table-top game (not shown) which a player can operate preferably while sitting. As illustrated by the different configurations shown in FIGS. 1A and 1B, the gaming device can be constructed with varying cabinet and display configurations.

Figure 2A:
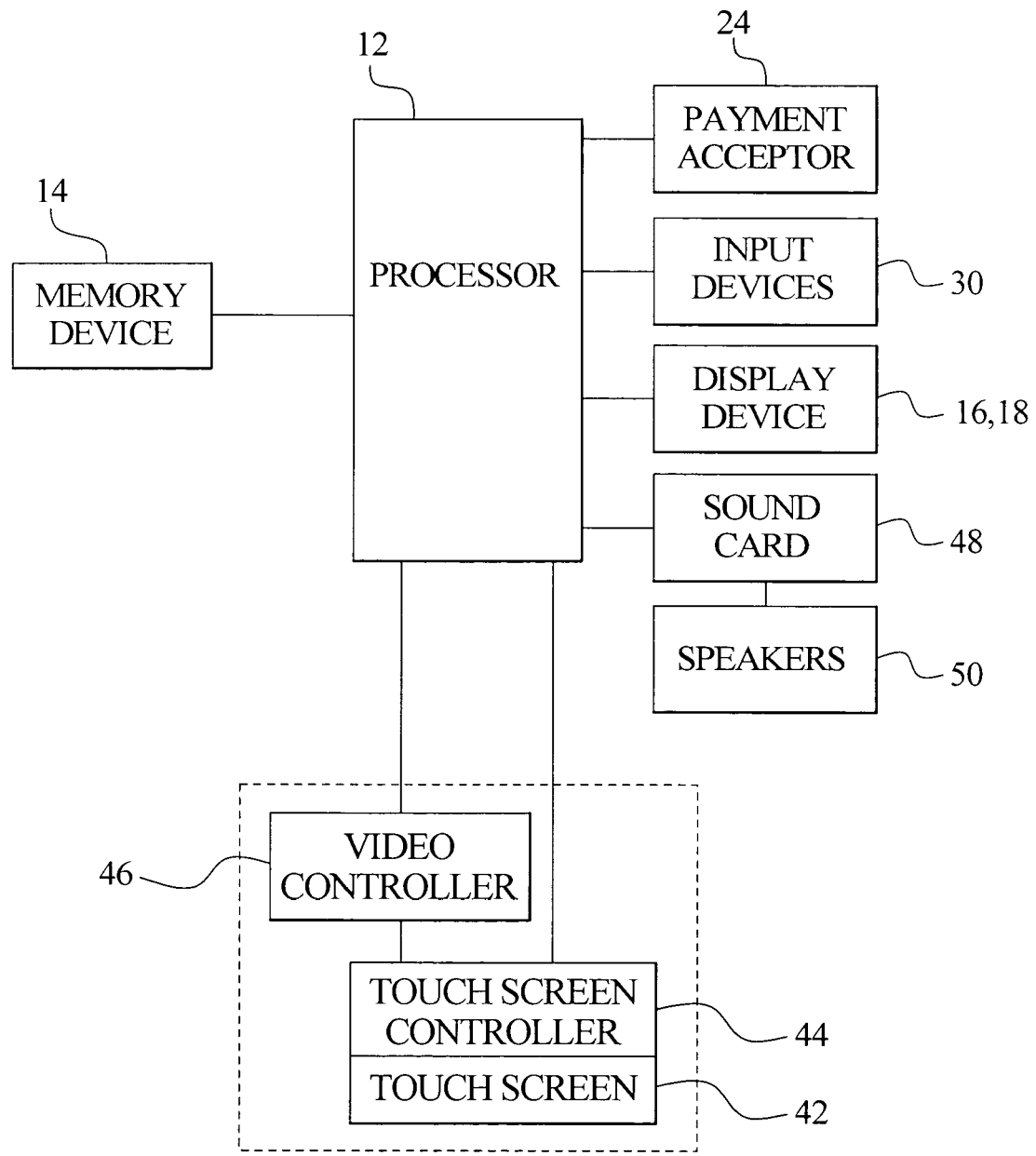
FIG. 2A is a schematic block diagram of the electronic configuration of one embodiment of the gaming device of the present invention.

In one embodiment, as illustrated in FIG. 2A, the gaming device preferably includes at least one processor 12, such as a microprocessor, a microcontroller-based platform, a suitable integrated circuit or one or more application-specific integrated circuits (ASIC's). The processor is in communication with or operable to access or to exchange signals with at least one data storage or memory device 14. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or information and applicable game rules that relate to the play of the gaming device. In one embodiment, the memory device includes random access memory (RAM). In one embodiment, the memory device includes read only memory (ROM). In one embodiment, the memory device includes flash memory and/or EEPROM (electrically erasable programmable read only memory). Any other suitable magnetic, optical and/or semiconductor memory may be implemented in conjunction with the gaming device of the present invention.

In one embodiment, part or all of the program code and/or operating data described above can be stored in a detachable or removable memory device, including, but not limited to, a suitable cartridge, disk or CD ROM. A player can use such a removable memory device in a desktop, a laptop personal computer, a personal digital assistant (PDA) or other computerized platform. The processor and memory device may be collectively referred to herein as a "computer" or "controller."

In one embodiment, as discussed in more detail below, the gaming device randomly generates awards and/or other game outcomes based on probability data. That is, each award or other game outcome is associated with a probability and the gaming device generates the award or other game outcome to be provided to the player based on the associated probabilities. In this embodiment, since the gaming device generates outcomes randomly or based upon a probability calculation, there is no certainty that the gaming device will ever provide the player with any specific award or other game outcome.

In another embodiment, as discussed in more detail below, the gaming device employs a predetermined or finite set or pool of awards or other game outcomes. In this embodiment, as each award or other game outcome is provided to the player, the gaming device removes the provided award or other game outcome from the predetermined set or pool. Once removed from the set or pool, the specific provided award or other game outcome cannot be provided to the player again. This type of gaming device provides players with all of the available awards or other game outcomes over the course of the play cycle and guarantees the amount of actual wins and losses.

In one embodiment, as illustrated in FIG. 2A, the gaming device includes one or more display devices controlled by the processor. The display devices are preferably connected to or mounted to the cabinet of the gaming device. The embodiment shown in FIG. 1A includes a central display device 16 which displays a primary game. This display device may also display any secondary game associated with the primary game as well as information relating to the primary or secondary game. The alternative embodiment shown in FIG. 1B includes a central display device 16 and an upper display device 18. The upper display device may display the primary game, any suitable secondary game associated with the primary game and/or information relating to the primary or secondary game. As seen in FIGS. 1A and 1B, in one embodiment, gaming device includes a credit display 20 which displays a player's current number of credits, cash, account balance or the equivalent. In one embodiment, gaming device includes a bet display 22 which displays a player's amount wagered.

The display devices may include, without limitation, a monitor, a television display, a plasma display, a liquid crystal display (LCD) a display based on light emitting diodes (LED) or any other suitable electronic device or display mechanism. In one embodiment, as described in more detail below, the display device includes a touch-screen with an associated touch-screen controller. The display devices may be of any suitable configuration, such as a square, rectangle, elongated rectangle.

The display devices of the gaming device are configured to display at least one and preferably a plurality of game or other suitable images, symbols and indicia such as any visual representation or exhibition of the movement of objects such as mechanical, virtual or video reels and wheels, dynamic lighting, video images, images of people, characters, places, things and faces of cards, tournament advertisements and the like.

In one alternative embodiment, the symbols, images and indicia displayed on or of the display device may be in mechanical form. That is, the display device may include any electromechanical device, such as one or more mechanical objects, such as one or more rotatable wheels, reels or dice, configured to display at least one and preferably a plurality of game or other suitable images, symbols or indicia.

As illustrated in FIG. 2A, in one embodiment, the gaming device includes at least one payment acceptor 24 in communication with the processor. As seen in FIGS. 1A and 1B, the payment acceptor may include a coin slot 26 and a payment, note or bill acceptor 28, where the player inserts money, coins or tokens. The player can place coins in the coin slot or paper money, ticket or voucher into the payment, note or bill acceptor. In other embodiments, devices such as readers or validators for credit cards, debit cards or credit slips could be used for accepting payment. In one embodiment, a player may insert an identification card into a card reader of the gaming device. In one embodiment, the identification card is a smart card having a programmed microchip or a magnetic strip coded with a player's identification, credit totals and other relevant information. In one embodiment, money may be transferred to a gaming device through electronic funds transfer. When a player funds the gaming device, the processor determines the amount of funds entered and the corresponding amount is shown on the credit or other suitable display as described above.

As seen in FIGS. 1A, 1B and 2A, in one embodiment the gaming device includes at least one and preferably a plurality of input devices 30 in communication with the processor. The input devices can include any suitable device which enables the player to produce an input signal which is read by the processor. In one embodiment, after appropriate funding of the gaming device, the input device is a game activation device, such as a pull arm 32 or a play button 34 which is used by the player to start any primary game or sequence of events in the gaming device. The play button can be any suitable play activator such as a bet one button, a max bet button or a repeat the bet button. In one embodiment, upon appropriate funding, the gaming device begins the game play automatically. In another embodiment, upon the player engaging one of the play buttons, the gaming device automatically activates game play.

In one embodiment, as shown in FIGS. 1A and 1B, one input device is a bet one button 36. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager permitted for a game of the gaming device.

In one embodiment, one input device is a cash out button 38. The player may push the cash out button and cash out to receive a cash payment or other suitable form of payment corresponding to the number of remaining credits. In one embodiment, when the player cashes out, the player receives the coins or tokens in a coin payout tray 40. In one embodiment, when the player cashes out, the player may receive other payout mechanisms such as tickets or credit slips redeemable by a cashier or funding to the player's electronically recordable identification card.

In one embodiment, as mentioned above and seen in FIG. 2A, one input device is a touch-screen 42 coupled with a touch-screen controller 44, or some other touch-sensitive display overlay to allow for player interaction with the images on the display. The touch-screen and the touch-screen controller are connected to a video controller 46. A player can make decisions and input signals into the gaming device by touching touch-screen at the appropriate places.

The gaming device may further include a plurality of communication ports for enabling communication of the processor with external peripherals, such as external video sources, expansion buses, game or other displays, an SCSI port or a key pad.

In one embodiment, as seen in FIG. 2A, the gaming device includes a sound generating device controlled by one or more sounds cards 48 which function in conjunction with the processor. In one embodiment, the sound generating device includes at least one and preferably a plurality of speakers 50 or other sound generating hardware and/or software for generating sounds, such as playing music for the primary and/or secondary game or for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized for or to provide any appropriate information.

In one embodiment, the gaming machine may include a player or other sensor, such as a camera in communication with the processor (and possibly controlled by the processor) that is selectively positioned to acquire an image of a player actively using the gaming device and/or the surrounding area of the gaming device. In one embodiment, the camera may be configured to selectively acquire still or moving (e.g., video) images and may be configured to acquire the images in either an analog, digital or other suitable format. The display devices may be configured to display the image acquired by the camera as well as display the visible manifestation of the game in split screen or picture-in-picture fashion. For example, the camera may acquire an image of the player and that image can be incorporated into the primary and/or secondary game as a game image, symbol or indicia.

Gaming device 10 can incorporate any suitable wagering primary or base game. The gaming machine or device of the present invention may include some or all of the features of conventional gaming machines or devices. The primary or base game may comprise any suitable reel-type game, card game, number game or other game of chance susceptible to representation in an electronic or electromechanical form which produces a random outcome based on probability data upon activation from a wager. That is, different primary wagering games, such as video poker games, video blackjack games, video Keno, video bingo or any other suitable primary or base game may be implemented into the present invention.

In one embodiment, as illustrated in FIGS. 1A and 1B, a base or primary game may be a slot game with one or more paylines 52. The paylines may be horizontal, vertical, circular, diagonal, angled or any combination thereof. In this embodiment, the gaming device displays at least one and preferably a plurality of reels 54, such as three to five reels 54 in either electromechanical form with mechanical rotating reels or video form with simulated reels and movement thereof. In one embodiment, an electromechanical slot machine includes a plurality of adjacent, rotatable wheels which may be combined and operably coupled with an electronic display of any suitable type. In another embodiment, if the reels 54 are in video form, the plurality of simulated video reels 54 are displayed on one or more of the display devices as described above. Each reel 54 displays a plurality of indicia such as bells, hearts, fruits, numbers, letters, bars or other images which preferably correspond to a theme associated with the gaming device. In this embodiment, the gaming device awards prizes when the reels of the primary game stop spinning if specified types and/or configurations of indicia or symbols occur on an active pay line or otherwise occur in a winning pattern.

In one embodiment, a base or primary game may be a poker game wherein the gaming device enables the player to play a conventional game of video poker and initially deals five cards all face up from a virtual deck of fifty-two card deck. Cards may be dealt as in a traditional game of cards or in the case of the gaming device, may also include that the cards are randomly selected from a predetermined number of cards. If the player wishes to draw, the player selects the cards to hold via one or more input device, such as pressing related hold buttons or via the touch screen. The player then presses the deal button and the unwanted or discarded cards are removed from the display and replacement cards are dealt from the remaining cards in the deck. This results in a final five-card hand. The final five-card hand is compared to a payout table which utilizes conventional poker hand rankings to determine the winning hands. The player is provided with an award based on a winning hand and the credits the player wagered.

In another embodiment, the base or primary game may be a multi-hand version of video poker. In this embodiment, the player is dealt at least two hands of cards. In one such embodiment, the cards are the same cards. In one embodiment each hand of cards is associated with its own deck of cards. The player chooses the cards to hold in a primary hand. The held cards in the primary hand are also held in the other hands of cards. The remaining non-held cards are removed from each hand displayed and for each hand replacement cards are randomly dealt into that hand. Since the replacement cards are randomly dealt independently for each hand, the replacement cards for each hand will usually be different. The poker hand rankings are then determined hand by hand and awards are provided to the player.

In one embodiment, a base or primary game may be a keno game wherein the gaming device displays a plurality of selectable indicia or numbers on at least one of the display devices. In this embodiment, the player selects at least one and preferable a plurality of the selectable indicia or numbers via an input device or via the touch screen. The gaming device then displays a series of drawn numbers to determine an amount of matches, if any, between the player's selected numbers and the gaming device's drawn numbers. The player is provided an award based on the amount of matches, if any, based on the amount of determined matches.

In one embodiment, in addition to winning credits in a base or primary game, the gaming device may also give players the opportunity to win credits in a bonus or secondary game or bonus or secondary round. The bonus or secondary game enables the player to obtain a prize or payout in addition to the prize or payout, if any, obtained from the base or primary game. In general, a bonus or secondary game produces a significantly higher level of player excitement than the base or primary game because it provides a greater expectation of winning than the base or primary game and is accompanied with more attractive or unusual features than the base or primary game.

In one embodiment, the bonus or secondary game may be any type of suitable game, either similar to or completely different from the base or primary game. In one embodiment, the gaming device includes a program which will automatically begin a bonus round when the player has achieved a triggering event or qualifying condition in the base or primary game. In one embodiment, the triggering event or qualifying condition may be a selected outcome in the primary game or a particular arrangement of one or more indicia on a display device in the primary game, such as the number seven appearing on three adjacent reels along a payline in the primary slot game embodiment seen in FIGS. 1A and 1B. In another embodiment, the triggering event or qualifying condition may be by exceeding a certain amount of game play (number of games, number of credits, amount of time), reaching a specified number of points earned during game play or as a random award.

In one embodiment, once a player has qualified for a bonus game, the player may subsequently enhance his/her bonus game participation through continued play on the base or primary game. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple such bonus qualifying events in the primary game may result in an arithmetic or geometric increase in the number of bonus wagering credits awarded. In one embodiment, extra bonus wagering credits may be redeemed during the bonus game to extend play of the bonus game.

In one embodiment, no separate entry fee or buy in for a bonus game need be employed. That is, a player may not purchase an entry into a bonus game; he must win or earn entry through play of the primary game and, thus, play of the primary game is encouraged. In another embodiment, qualification of the bonus or secondary game could be accomplished through a simple "buy in" by the player if, for example, the player has been unsuccessful at qualifying through other specified activities.

Figure 2B:
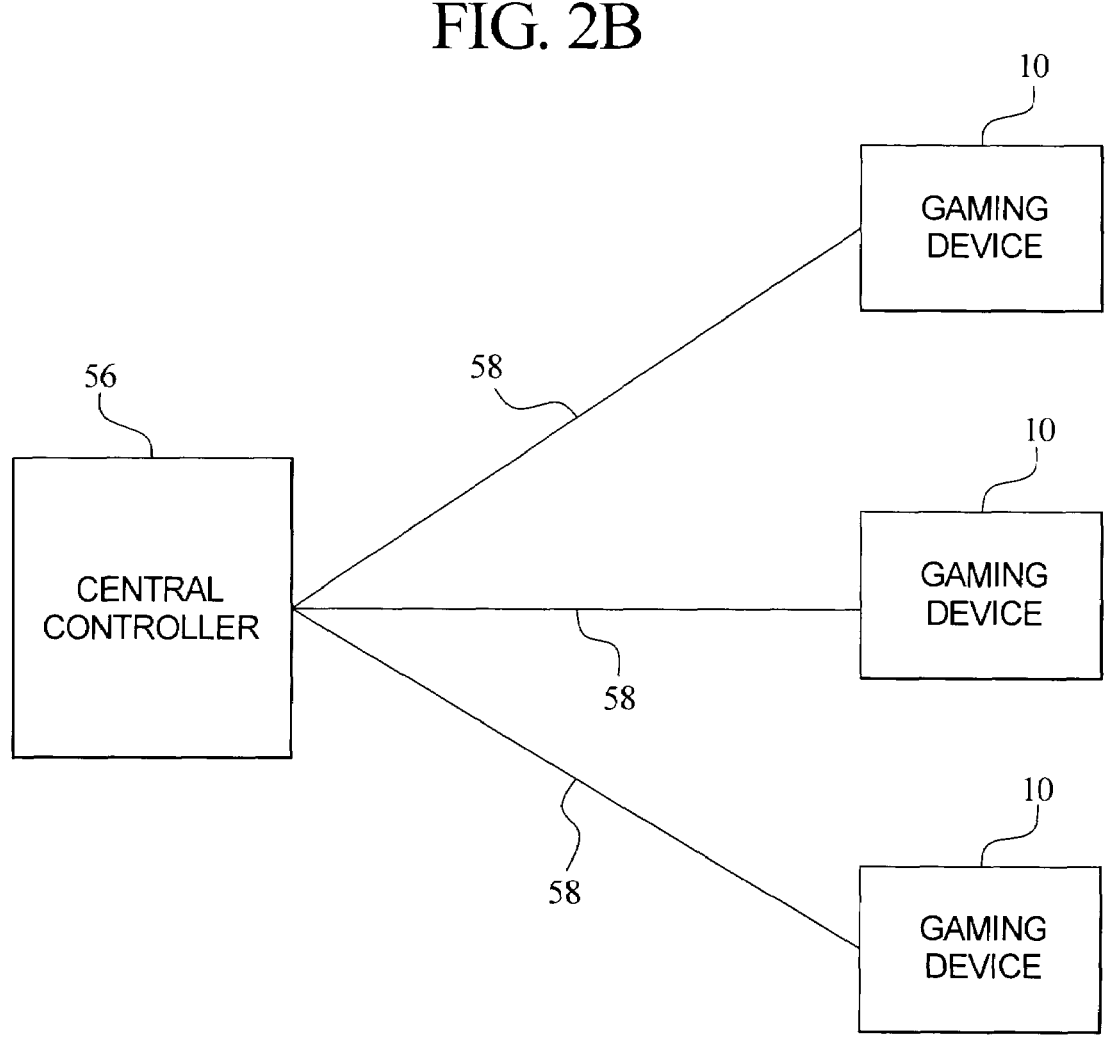
FIG. 2B is a schematic block diagram illustrating a plurality of gaming terminals and communication with a central controller.

In one embodiment, as illustrated in FIG. 2B, one or more of the gaming devices 10 of the present invention may be connected to each other through a data network or a remote communication link 58 with some or all of the functions of each gaming device provided at a central location such as a central server or central controller 56. More specifically, the processor of each gaming device may be designed to facilitate transmission of signals between the individual gaming device and the central server or controller.

In one embodiment, the game outcome provided to the player is determined by a central server or controller and provided to the player at the gaming device of the present invention. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the primary game based on probability data. In another embodiment, the central server or controller randomly generates a game outcome for the secondary game based on probability data. In another embodiment, the central server or controller randomly generates a game outcome for both the primary game and the secondary game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome can include a primary game outcome, a secondary game outcome, primary and secondary game outcomes, or a series of game outcomes such a free games.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server or controller and communicated to the initiated gaming device to be presented or displayed to the player. Central production or control can assist a gaming establishment or other entity in maintaining appropriate records, controlling gaming, reducing and preventing cheating or electronic or other errors, reducing or eliminating win-loss volatility and the like.

In another embodiment, one or more of the gaming devices of the present invention are in communication with a central server or controller for monitoring purposes only. That is, each individual gaming device randomly generates the game outcomes to be provided to the player and the central server or controller monitors the activities and events occurring on the plurality of gaming devices. In one embodiment, the gaming network includes a real-time or on-line accounting and gaming information system operably coupled to the central server or controller. The accounting and gaming information system of this embodiment includes a player database for storing player profiles, a player tracking module for tracking players and a credit system for providing automated casino transactions.

A plurality of the gaming devices of the present invention are capable of being connected together through a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system of the present invention may be substantially identical to the LAN gaming system described above, although the number of gaming devices in each system may vary relative to each other.

In another embodiment, the data network is an internet or intranet. In this embodiment, the operation of the gaming device can be viewed at the gaming device with at least one internet browser. In this embodiment, operation of the gaming device and accumulation of credits may be accomplished with only a connection to the central server or controller (the internet/intranet server) through a conventional phone or other data transmission line, digital signal line (DSL), T-1 line, coaxial cable, fiber optic cable, or other suitable connection. In this embodiment, players may access an Internet game page from any location where an internet connection and computer, or other internet facilitator are available. The expansion in the number of computers and number and speed of internet connections in recent years increases opportunities for players to play from an ever-increasing number of remote sites. It should be appreciated that enhanced bandwidth of digital wireless communications may render such technology suitable for some or all communications according to the present invention, particularly if such communications are encrypted. Higher data transmission speeds may be useful for enhancing the sophistication and response of the display and interaction with the player.

In another embodiment, a plurality of gaming devices at one or more gaming sites may be networked to a central server in a progressive configuration, as known in the art, wherein a portion of each wager to initiate a base or primary game may be allocated to bonus or secondary event awards. In one embodiment, a host site computer is coupled to a plurality of the central servers at a variety of mutually remote gaming sites for providing a multi-site linked progressive automated gaming system. In one embodiment, a host site computer may serve gaming devices distributed throughout a number of properties at different geographical locations including, for example, different locations within a city or different cities within a state.

In one embodiment, the host site computer is maintained for the overall operation and control of the system. In this embodiment, a host site computer oversees the entire progressive gaming system and is the master for computing all progressive jackpots. All participating gaming sites report to, and receive information from, the host site computer. Each central server computer is responsible for all data communication between the gaming device hardware and software and the host site computer.

Replicator Symbol

The present invention is directed to a gaming device having a game including a plurality of reels, wherein the reels include one or more split symbols or replicator symbols that display at least two identical symbols at a single symbol position on the reels. The replicator symbols increase the likelihood that a winning combination of symbols occurs on the reels. Therefore, a player's excitement and enjoyment of the game increases because the player believes that they have a better opportunity to obtain a winning symbol combination and thereby an award in the game.

Figure 3A:
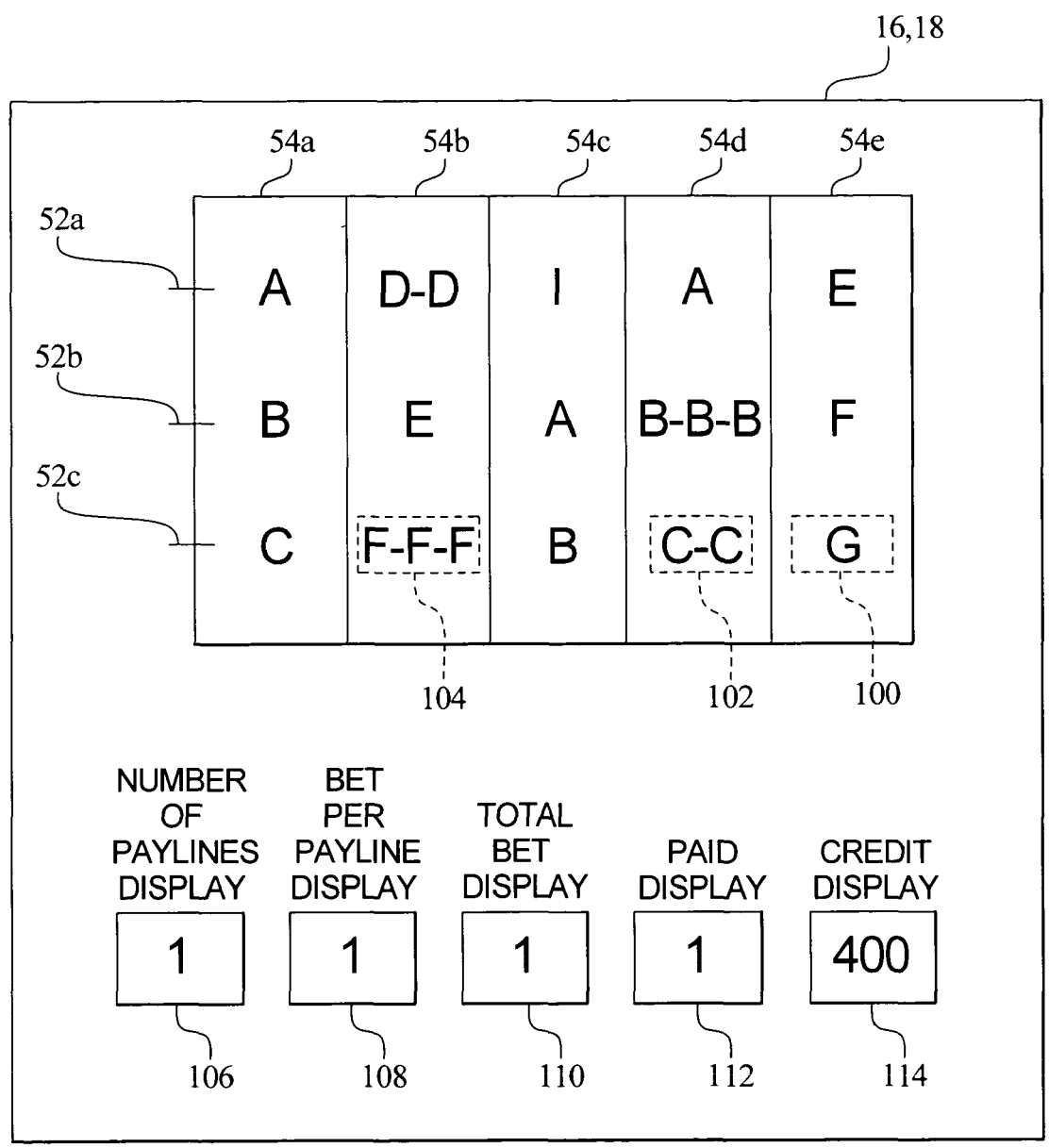
FIG. 3A is a front elevation view of one of the display devices of FIGS. 1A and 1B illustrating one embodiment of the present invention.

Referring now to FIG. 3A, one embodiment of the present invention is illustrated where one of the display devices 30 or 32 displays a plurality of reels such as reels 54a, 54b, 54c, 54d and 54e. Each of the reels 54 includes at least one and preferably a plurality of symbol positions. The symbol positions are the positions or areas on the reels where symbols are located and displayed to a player. For example, symbol position (3/2) refers to the third reel (i.e., reel 54c) and the second position or area on that reel (i.e., the position including the A symbol). In this embodiment, the reels 54 include a plurality of symbols 100 which are the letters A, B, C, D, E, F, G, H and I. It should be appreciated that the reels may include any suitable symbols, characters or images as desired by the game implementer. In one embodiment, each of the symbol positions on the reels includes a predetermined or designated symbol from the plurality of symbols. In another embodiment, each of the symbol positions on the reels includes a randomly determined symbol from the plurality of symbols. It should be appreciated that any of the symbols may be in any of the symbol positions on the reels.

In one embodiment, the symbols 100 include at least one split symbol or replicator symbol 102 or 104. Each replicator symbol includes at least two symbols from the plurality of symbols at a single symbol position on the reels. For example, replicator symbol 102 includes two "C" symbols in one symbol position (4/3) on reel 54d. Similarly, replicator symbol 104 includes three "F" symbols at a single symbol position (2/3) on reel 54b. In this embodiment, each replicator symbol includes at least two of the same symbols or identical symbols at a single symbol position. In another embodiment, the replicator symbols include at least two symbols from the plurality of symbols where at least one of the symbols associated with the replicator symbol is different. The replicator symbols provide additional symbols on the reels and therefore enhance the probability that a winning symbol combination or combinations will occur on the reels. In one embodiment, the gaming device provides an outcome such as one or more awards, prizes, credits, free spins, free games, game elements or any other suitable award to a player when a designated symbol combination including at least two of the symbols is indicated in at least one of the symbol positions on the reels 54.

In one embodiment a plurality of paylines such as paylines 52a, 52b and 52c are associated with the reels 54. In one embodiment, the gaming device provides an outcome to the player when a designated combination of symbols such as a winning combination of symbols is indicated in at least one symbol position on one of the paylines 52a, 52b or 52c. In another embodiment, the gaming device provides the outcome to the player when the winning symbol combination is indicated in at least one symbol position on a pluralitiy of the paylines. In a further embodiment, the gaming device provides the outcome to the player when a winning symbol combination is indicated in at least one symbol position on any of the paylines associated with the reels. It should be appreciated that a designated combination of symbols or a winning symbol combination may be a line pay, a line scatter pay, a reel scatter pay or any suitable winning combination of the symbols.

In one embodiment, the gaming device includes a set of meters or displays used to display the salient information for the game, including the number of credits, number of pay lines, amount bet per line, total bet, and the amount paid to the player in a spin of the reels. If necessary, any number of meters may be added to further facilitate control of the games.

In one embodiment, the number of credits in the credit pool is displayed by a credit meter or credit display 114. The pool of credits increases and decreases according to the player's wins or losses in a game and may be supplemented, if necessary, by the player when the player deposits additional coins, tokens or paper currency into the gaming device.

In one embodiment, the number of pay lines upon which the player wagered in a game is displayed on a Number of Pay Lines meter or display 106. The pay lines are activated in a predetermined order, as follows: the first wager is applied to pay line 52a; the second wager is applied to pay line 52b; and the third wager is applied to pay line 52c. However, the games may have fewer or greater than three pay lines and activate the paylines in any suitable order.

In one embodiment, the number of credits wagered on each pay line is displayed on a Bet Per Line display. In this embodiment, the same amount is wagered on each of the pay lines. Alternatively, In another embodiment the player could wager different amounts on each pay line in a game.

In one embodiment, the total number of credits bet on all of the pay lines is displayed by a Total Bet display 110. The total bet is calculated by multiplying the number of pay lines by the bet per line. In addition, the number of credits awarded for any winning symbol combinations is displayed by a Paid display 112.

In one embodiment, all winning combinations are defined by pay tables or award summary tables associated with a game. The pay tables define the winning symbol combinations for a game such as a winning symbol combination including three or more of the same symbols on a pay line. Each symbol in a symbol position counts towards the total number of symbols on a pay line. In addition, a pay table may also define scatter awards for winning symbol combinations including symbols scattered anywhere on the reels. Alternatively, any pre-determined or designated arrangement of symbols may be defined as a winning symbol combination in a game and any suitable number of awards or credits may be provided to a player for the winning symbol combinations.

EXAMPLE

Referring now to FIGS. 3A to 3E, an example of the one embodiment of the present invention is illustrated where the gaming device includes a game having a plurality of reels such as reels 54a, 54b, 54c, 54d and 54e. Each reel 54 includes a plurality of symbol positions which are the positions on the reels where symbols are located and displayed to a player. Additionally, the reels include a plurality of symbols such as letters A, B, C, D, E, F, G, H and I. It should be appreciated that the symbols may be any suitable symbols or images. The gaming device also includes a plurality of paylines 52a, 52b and 52c associated with the reels. In this example, there are three horizontal paylines associated with the reels. It should be appreciated that any suitable number of paylines may be associated with the reels. It should be appreciated that the paylines may be horizontal, vertical or any suitable configuration on the reels.

In this embodiment, the player must obtain a designated combination of the symbols 100 on at least one of the paylines 52a, 52b or 52c. Furthermore, in this example, the winning symbol combinations must form a line pay or a combination of at least three of the same symbols indicated in an least one of the symbol positions on reel 54a. For example, if one of the symbol positions on reel 54a includes a replicator symbol 102 or 104 and one of the symbol positions on reel 54b, on the same payline as the replicator symbol, includes the same symbol as the symbols of the replicator symbol, the player obtains a winning symbol combination including three of the same symbols on that payline. However, if the three identical or matching symbols are indicated in adjacent symbol positions on payline 52a associated with reels 54b and 54c but not reel 54a, the player does not obtain a winning symbol combination. Additionally in this example, the gaming device displays several different meters or displays as described above.

Figure 3B:
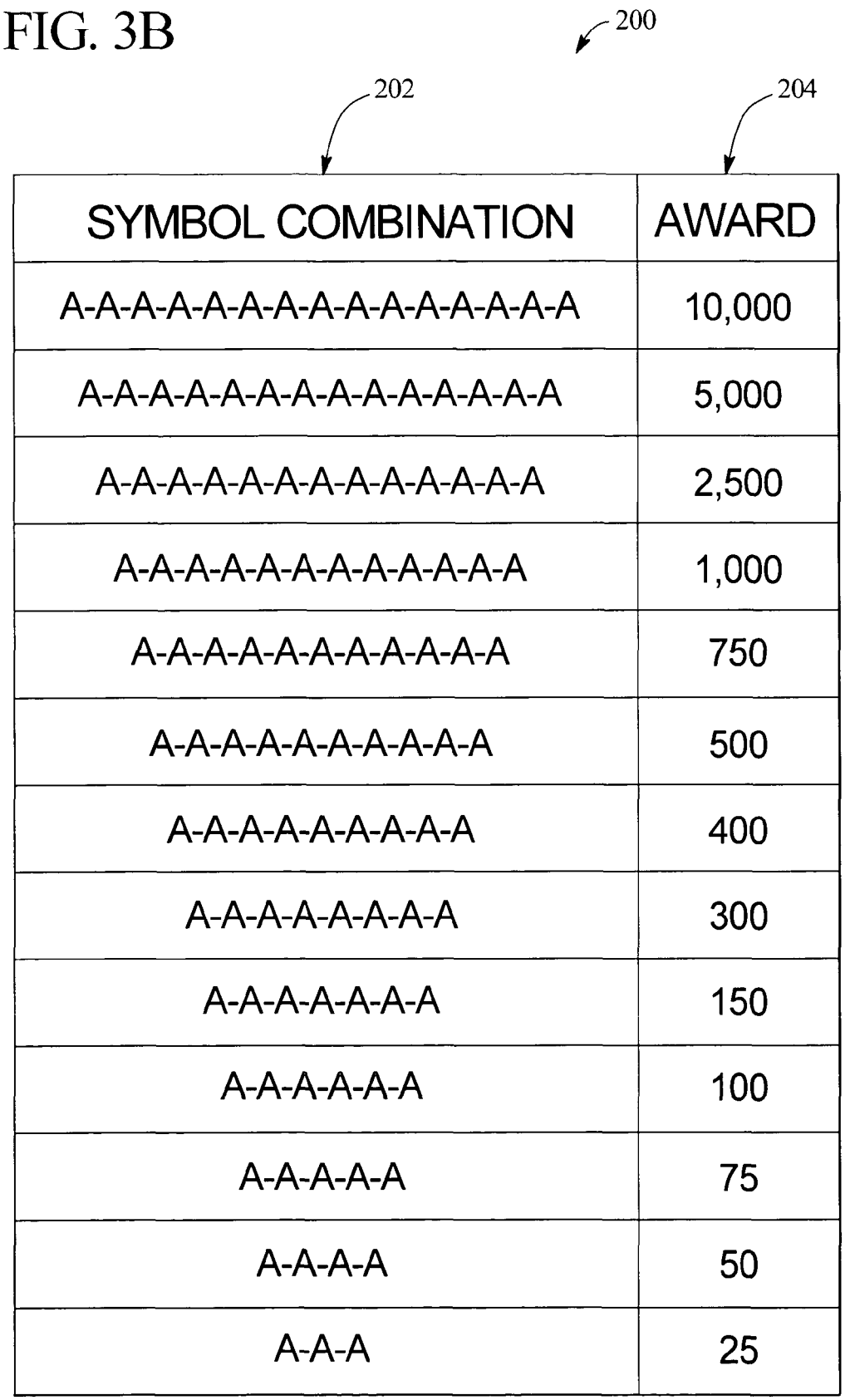
FIG. 3B is a schematic diagram illustrating an award summary table associated with the embodiment of FIG. 3A.

Referring to FIG. 3B, a payout table or award summary table 200 indicates the winning symbol combinations 202 and the awards or credits associated with each of those winning symbol combinations. The award summary table 200 shows the winning symbol combinations for one of the symbols, the letter A, and the awards associated with that symbol. In this example, all of the symbols on the reels include the same winning symbol combinations and the same awards associated with those winning symbol combinations. For example, a winning symbol combination including the letter C provides the same award as a winning symbol combination including the letter A when the winning symbol combination is indicated in at least one of the symbol positions on a payline associated with the reels. It should be appreciated that the designated symbol combinations or winning symbol combinations in the game may include any suitable combination of the same symbols or different symbols in the game. In addition, it should be appreciated that the winning symbol combinations may provide any suitable awards, prizes, free games, free spins, game elements or any other suitable award, awards or outcomes in the game.

Referring to FIG. 3A, the player initially inserts currency into the game and obtains four hundred credits as indicated by the credit display 114. The player in now ready to being playing the game.

Figure 3C:
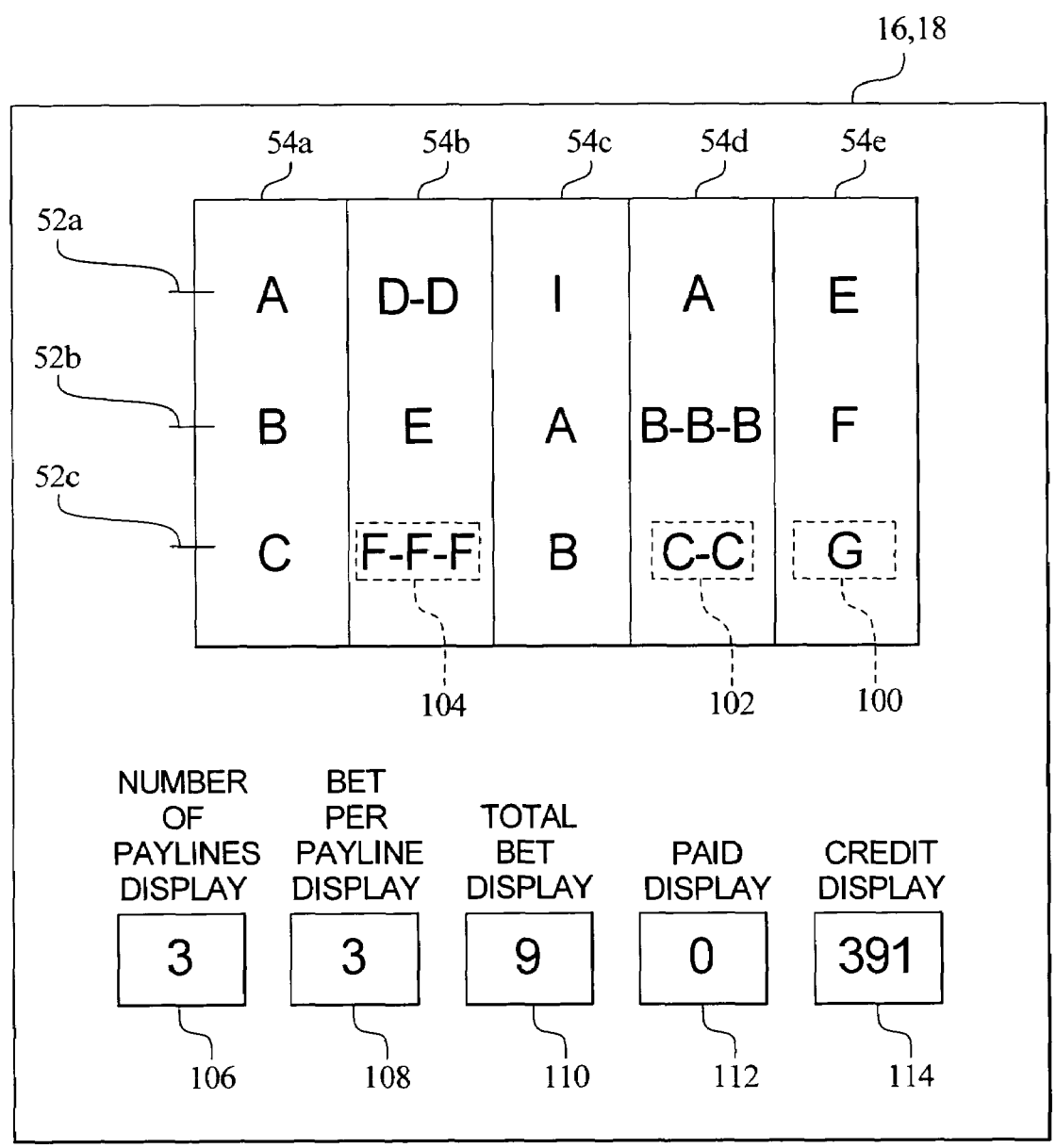
FIGS. 3C, 3D, 3E and 3F are front elevation views of one of the display devices of FIGS. 1A and 1B illustrating an example of the embodiment of FIG. 3A.
Figure 3D:
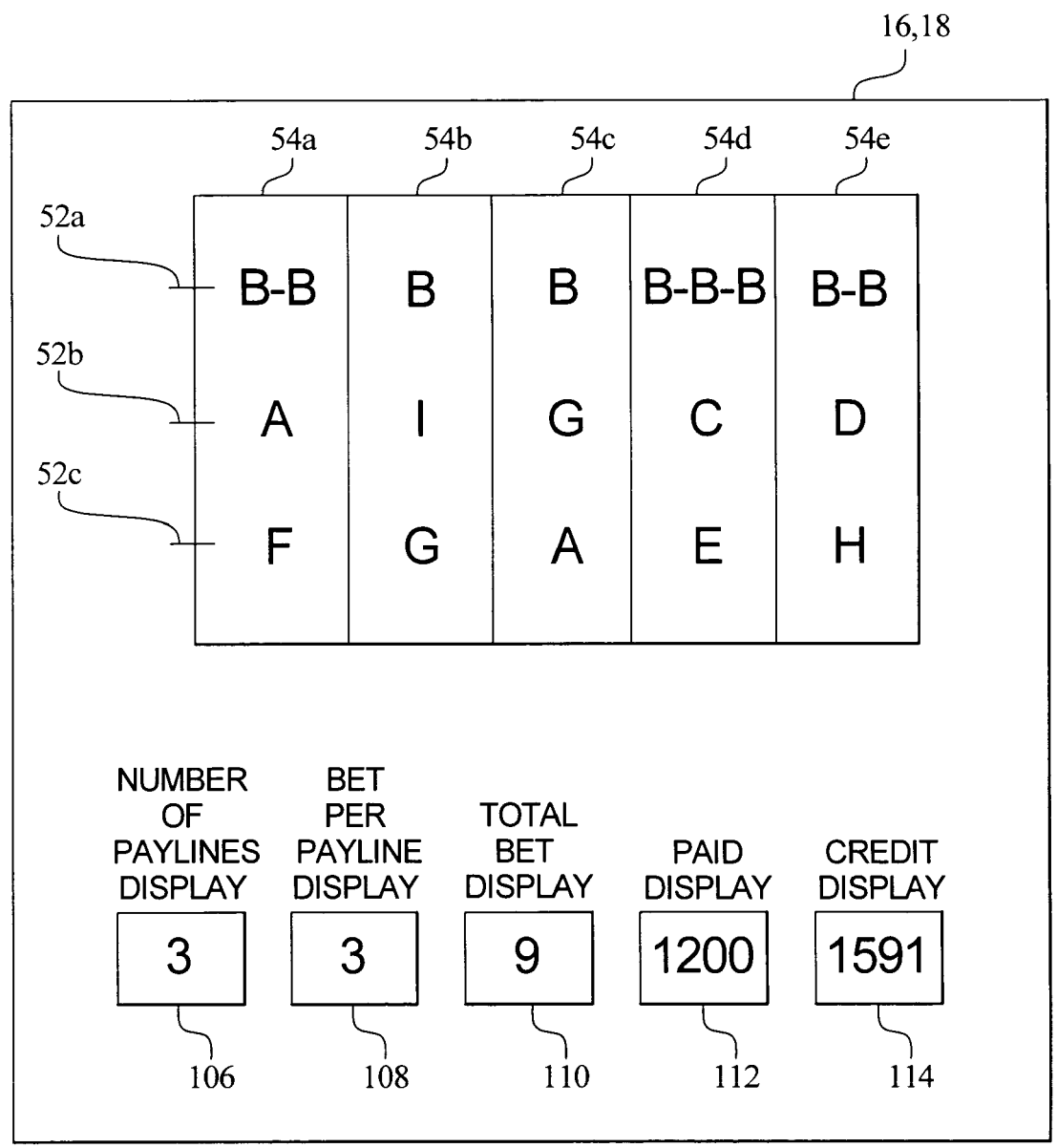
Figure 3E:
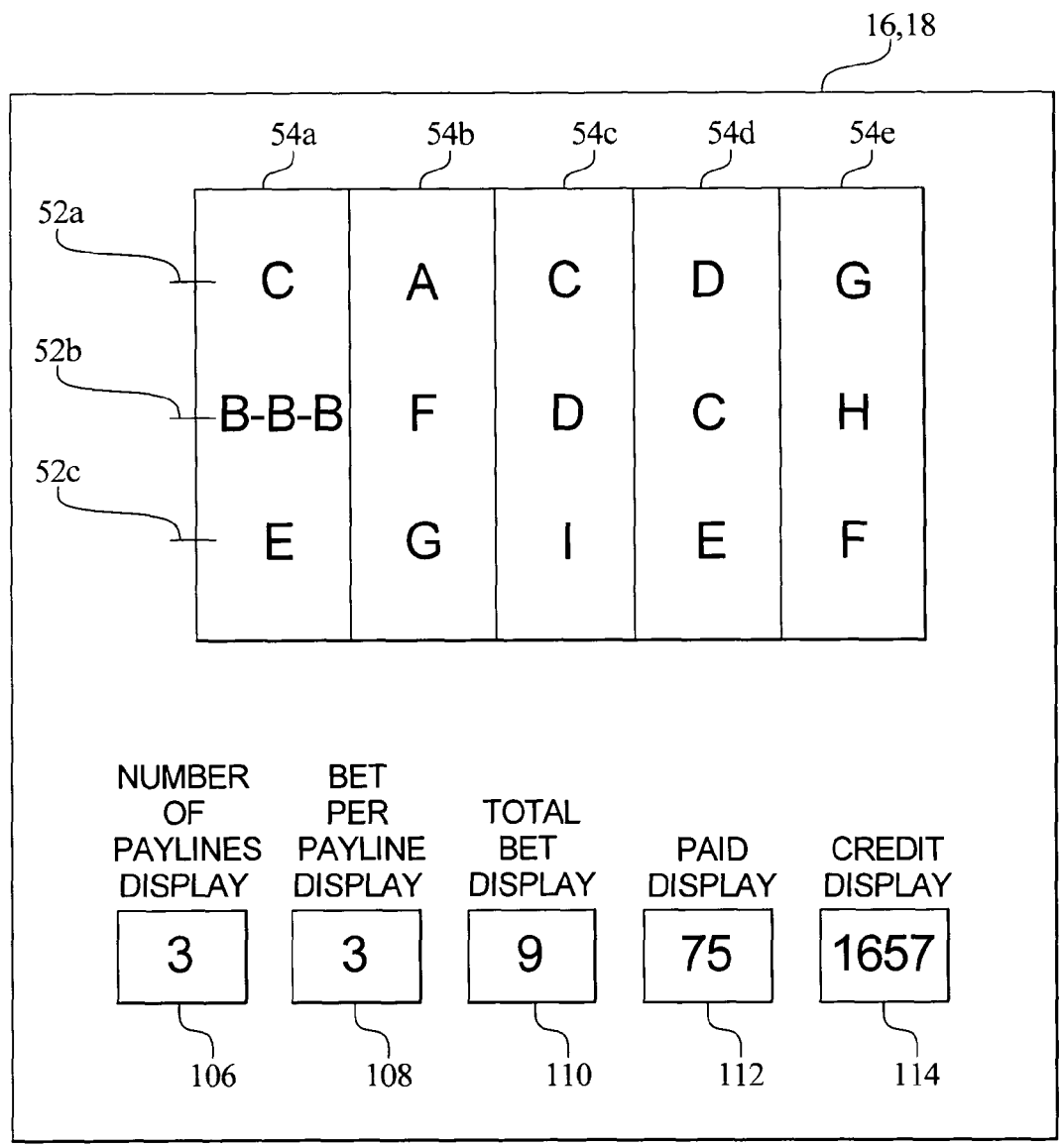

Referring to FIGS. 3C to 3E, the player begins playing the game by depressing the select paylines button two times to increase the number of paylines wagered in the game from one to three as indicated by the number of paylines display 106. In this example, there are three paylines 52a, 52b and 52c associated with the reels 54. Therefore, the player has wagered on the maximum number of paylines in the game. The player then presses the bet per payline button to increase their bet or wager on each payline from one to three credits as indicated by the bet per payline display 108. Therefore, the player is wagering three credits on each of the paylines 52a, 52b and 52c. Based on the wager made by the player in this spin or activation of the reels in the game, the player has wagered a total bet or wager of nine as indicated by the total bet display 110. The total bet equals the number of paylines wagered on by the player of three multiplied by the amount bet per payline by the player, which is also three. Because the game has not started yet the pay display indicates a zero or that the player has not received any awards or credits in the game. The total bet of nine made by the player in this activation or spin of the reels is subtracted from the player's total credits in the game of four hundred which results in the new total number of credits being three hundred ninety-one as indicated by the credit display 114.

Referring now to FIG. 3D, the gaming device or player presses or activates a play button 34 or pull arm 32 (shown in FIGS. 1A and 1B) to activate or spin the reels for the first time in the game. The reels stop and display a plurality of symbols in the symbol positions on the reels 54. Specifically, the reels or symbol matrix on the reels includes a winning symbol combination at the symbol positions on payline 52a associated with reels 54a, 54b, 54c, 54d and 54e. The winning symbol combination includes nine B symbols. The winning combination including the nine B symbols is formed by a replicator symbol including two B symbols at symbol position 1/1, a single B symbol at symbol position 2/1, another single B symbol at symbol position 3/1, a replicator symbol including three B symbols at symbol position 4/1 and a replicator symbol including two B symbols at symbol position 5/1. According to the pay table or award summary table 200 in FIG. 3B, a winning symbol combination including nine B symbols pays four hundred credits for each credit wagered upon payline 52a. Therefore, the spin award or award for this spin is an award of one thousand two hundred credits (i.e., four hundred credits times three credits wagered on payline 52a). The award of one thousand two hundred credits is added to the player's total credits and gives the player a new total number of credits of one thousand five hundred ninety-one as indicated by the credit display 114.

Referring now to FIG. 3E, the gaming device or player activates or spins the reels for a second time in the game. Again, the player wagers on the maximum number of paylines, three, as indicated by the number of paylines display 106. The player also wagered or bet three credits on each of the paylines as indicated by the bet per payline display 108. Therefore, the player's total bet is nine as indicated by the total bet display 110. The total bet of nine is subtracted from the credit display shown in FIG. 3D to give the player a total number of credits before their second spin of one thousand five hundred eighty-two. The gaming device or player activates or spins the reels and when the reels stop, a plurality of symbols are indicated in the symbol positions on the reels. Specifically, a winning symbol combination including three B symbols is indicated at symbol position 1/2 on the reels. In fact, the winning symbol combination including three B symbols includes a single replicator symbol which includes three B symbols at a single symbol position (1/2) on reel 54a. Therefore, the replicator symbol enables the player to obtain a winning symbol combination at a single symbol position on the reels where none of the other symbol positions on the reels combined to form a winning combination of symbols in that spin. As shown in FIG. 3B, a winning symbol combination including three B symbols provides a payout or award of twenty-five credits. Thus, the gaming device awards seventy-five credits to the player (i.e., twenty-five credits times three credits wagered on payline 54b). The credit meter 114 counts up from one thousand five hundred eighty-two to one thousand six hundred fifty-seven to reflect the award obtained by the player in that spin.

Figure 3F:
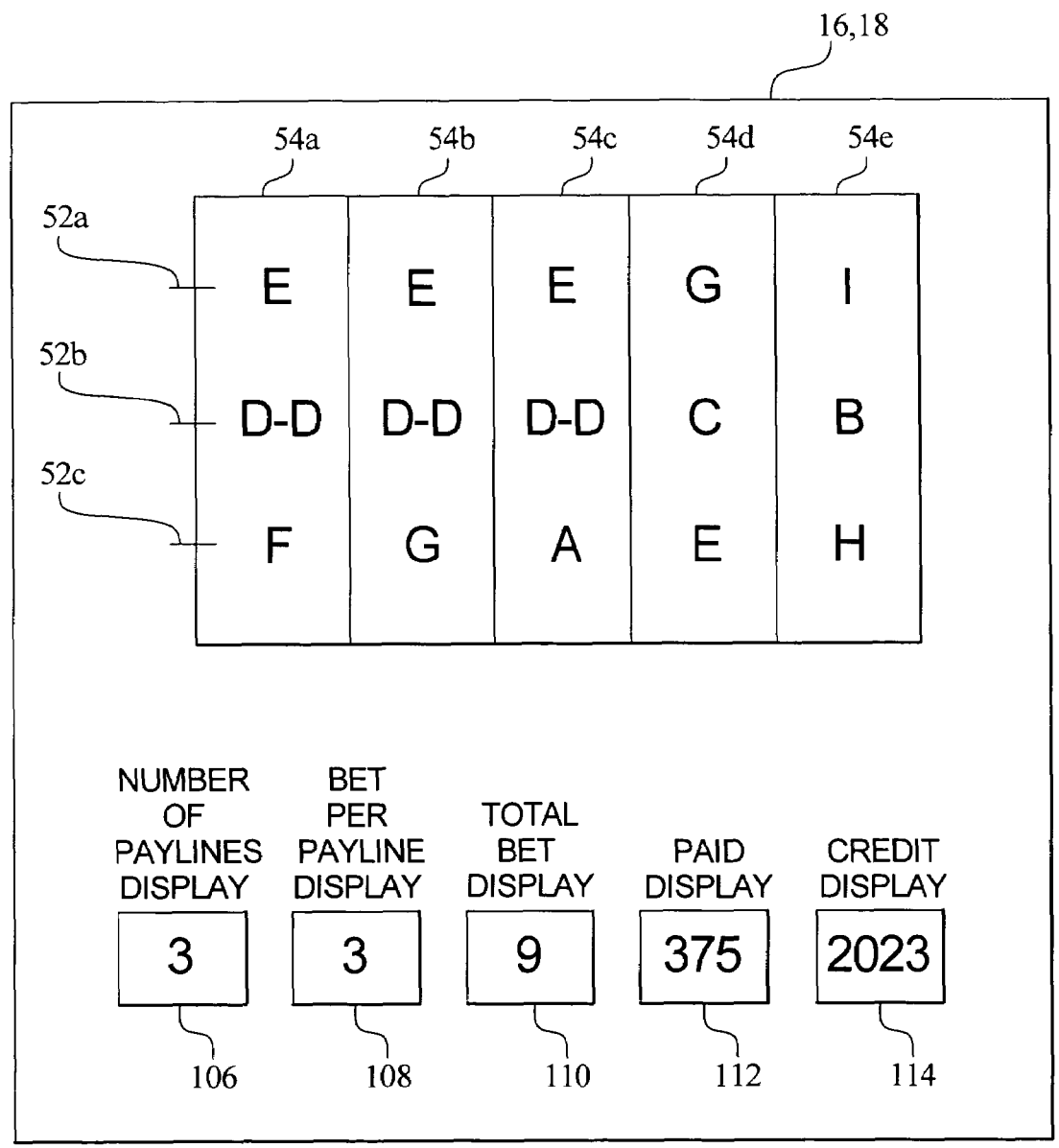

Referring to FIG. 3F, the player decides to spin the reels for a third time in the game. The player selects a maximum number of paylines, three, for the spin as indicated by the number of paylines display 106. The player also bets three credits for each of the paylines that they selected as indicated by the bet per payline display 108. Thus, the total bet made by the player for this spin is nine as indicated by the total bet display 110. The total bet of nine is subtracted from the player's total credits. The player's new total number of credits prior to this spin becomes one thousand six hundred forty-eight. The gaming device or player spins the reels for the third time in the game. The reels stops spinning and indicate a plurality of symbols at the symbol positions on the reels. Specifically, a winning symbol combination including three E symbols is indicated on payline 54a and a winning symbol combination including six D symbols is indicated on payline 54b. In this example, the gaming device provides awards for each winning symbol combination indicated on the reels. In another embodiment, the gaming device only provides the largest award associated with any of the winning symbol combinations indicated on the reels. It should be appreciated that the gaming device may provide one, a plurality or all of the awards associated with winning symbol combinations indicated on the reels.

In the example, the winning symbol combination including the three E symbols indicated on payline 54b is formed by a single E symbol at symbol position 1/1, a single E symbol at symbol position 2/1 and a single E symbol at symbol position 3/1. The winning symbol combination including six D symbols is formed by a replicator symbol including two D symbols at symbol position 1/2, a replicator symbol including two D symbols at symbol position 2/2 and a replicator symbol including two D symbols at symbol position 3/2. Therefore, the two different winning symbol combinations show how the replicator symbols may provide more winning symbol combinations and thereby more awards in a game and also how these replicator symbols may provide larger awards in the game.

As shown in FIG. 3B, the award or payout associated with three E symbols is twenty-five and the award associated with six D symbols is one hundred. Therefore, the total award or payout for this spin is three hundred seventy-five (i.e., twenty-five credits multiplied by three credits wagered on payline 54a plus 100 credits multiplied by 3 credits wagered on payline 54b). The total award of three hundred seventy-five is added to player's total credits in the game to give the player a new total number of credits of two thousand twenty-three as indicated by the credits displayed 114. The player decides not to continue playing the game and therefore presses the cash out button to receive the total number of credits of two thousand twenty-three as indicated by the credit display 114.

Referring now to FIG. 4, another embodiment of the present invention is illustrated where the symbols include at least one bonus symbol. In one embodiment, the gaming device provides a bonus outcome such as a bonus award to the player when at least two of the bonus symbols are indicated in at least one symbol position on a payline associated with the reels. In another embodiment, the gaming device provides the bonus outcome to the player when at least two of the bonus symbols are indicated in at least one symbol position on any of the paylines or in a scatter position associated with the reels. The bonus symbol provides the player with an additional outcome or outcomes in a game such as an additional award or awards, which increases the player's excitement and enjoyment of the game. It should be appreciated that the bonus symbol may be any suitable symbol, character or image desired by the game implementer. It should also be appreciated that the bonus outcome may include awards, prizes, credits, free spins, free games, game elements or any other suitable outcome.

As shown in FIG. 4, three bonus symbols 300a, 300b and 300c are indicated at three different symbol positions on the reels 54. Specifically, bonus symbol 300a is indicated at symbol position 2/2, bonus symbol 300b is indicated at symbol position 3/3 and bonus symbol 300c is indicated at symbol position 5/3. In this example, three bonus symbols indicated in at least one symbol position on any of the paylines associated with the reels provides a bonus outcome including a multiplier of 3×. Therefore, any outcomes obtained by the player are modified by the multiplier associated with the winning bonus symbols combination. In this example, the reels indicate a winning symbol combination including four A symbols on payline 54a. This winning symbol combination is formed by a single A symbol at symbol position 1/1, a replicator symbol including two A symbols at symbol position 2/1 and a single A symbol indicated at symbol position 3/1. As illustrated above, the replicator symbol increases the number of symbols in the winning symbol combination and therefore provides the player with a larger award. The winning symbol combination including four A symbols provides an award of fifty as indicated by the award table 200 in FIG. 3B. Therefore, the award of fifty is multiplied by the bet per payline of three as indicated in the bet per payline display 108 to provide the player with an award associated with this spin of one hundred fifty. The spin award of one hundred fifty is multiplied by the bonus outcome or multiplier 3× to provide a total award for this spin of four hundred fifty as indicated in the paid display 112. Because the player did not obtain any awards previously in the game, the player's total number of credits or total award is four hundred fifty as indicated by the credit display 114.

It should be appreciated that the present invention may be employed in a primary game, a secondary or bonus game, or any other suitable type of game.

While the present invention is described in connection with what is presently considered to be the most practical and preferred embodiments, it should be appreciated that the invention is not limited to the disclosed embodiments, and is intended to cover various modifications and equivalent arrangements included within the spirit and scope of the claims. Modifications and variations in the present invention may be made without departing from the novel aspects of the invention as defined in the claims, and this application is limited only by the scope of the claims.

The invention is claimed as follows:

1. A gaming device comprising:
at least one display device;
at least one input device; and
at least one processor programmed to operate with the at least one display device and the at least one input device to:
(a) provide a game including:
 (i) a plurality of reels, each of said reels including a plurality of symbol positions;
 (ii) a plurality of symbols at the plurality of symbol positions on said reels, said plurality of symbols including a plurality of first symbols, wherein at least two of the first symbols are different, and at least one replicator symbol, wherein said at least one replicator symbol includes at least two of the same symbols at one of the symbol positions;
 (iii) at least one predetermined winning symbol combination of a plurality of winning symbol combinations including at least one of said plurality of first symbols, wherein said predetermined winning symbol combination occurs in a predetermined number of symbol positions and is associated with an award; and
 (iv) at least one additional winning symbol combination of said plurality of winning symbol combinations including the at least one replicator symbol and at least one of said plurality of first symbols, wherein said additional winning symbol combination is also associated with said award and occurs in fewer symbol positions than said predetermined number of symbol positions; and
(b) for a play of the game:
 (i) activate the reels to generate one of the plurality of symbols at each of said plurality of symbol positions;
 (ii) determine both if said predetermined winning symbol combination and said additional winning symbol combination are generated on the reels, wherein for said determination, each of the same symbols of the at least one replicator symbol simultaneously functions as an individual symbol; and (iii) display said award if either of said predetermined winning symbol combination or said additional winning symbol combination is generated on the reels.

2. The gaming device of claim 1, which includes a payline associated with the reels.

3. The gaming device of claim 2, wherein the symbol positions associated with both of the winning symbol combinations are on the payline.

4. The gaming device of claim 1, which includes a plurality of paylines associated with the reels.

5. The gaming device of claim 4, wherein the winning symbol combinations occur at a plurality of the symbol positions on the paylines.

6. The gaming device of claim 1, wherein the winning symbol combinations are determined by at least one of: a random determination, a pre-determination and a determination based on a wager made by the player.

7. The gaming device of claim 1, wherein the symbols include at least one bonus symbol.

8. The gaming device of claim 7, which includes at least one bonus award provided to the player when a winning symbol combination including said bonus symbol occurs on the reels.

9. The gaming device of claim 8, wherein the bonus award is modified by at least one modifier.

10. The gaming device of claim 9, wherein the modifier includes a multiplier.

11. A gaming device comprising:
at least one display device;
at least one input device; and
at least one processor programmed to operate with the at least one display device and the at least one input device to;
(a) provide a game including:
(i) a plurality of reels, each of said reels including a plurality of symbol positions;
(ii) a plurality of symbols at the plurality of symbol positions on said reels, said plurality of symbols including a plurality of first symbols, wherein at least two of the first symbols are different and at least one replicator symbol, wherein said at least one replicator symbol includes at least two identical symbols at one of the plurality of symbol positions;
(iii) at least one predetermined winning symbol combination of a plurality of winning symbol combinations including at least one of said plurality of first symbols, wherein said predetermined winning symbol combination occurs in a predetermined number of symbol positions and is associated with an award adapted to be provided to a player; and
(iv) at least one additional winning symbol combination of said plurality of winning symbol combinations including the at least one replicator symbol and at least one of said plurality of first symbols, wherein said additional winning symbol combination is associated with the same award as the predetermined winning symbol combination and occurs in fewer symbol positions than said predetermined number of symbol positions; and
(b) for a play of the game:
(i) activate the reels to generate one of the plurality of symbols at each of said plurality of symbol positions;

(ii) determine both if said predetermined winning symbol combination and said additional winning symbol combination are generated on the reels, wherein for said determination, each of the same symbols of the at least one replicator symbol simultaneously functions as an individual symbol; and (iii) display said award if:
(a) said predetermined winning symbol combination is generated on the reels or
(b) said additional winning symbol combination is generated on the reels.

12. The gaming device of claim 11, which includes a payline associated with the reels.

13. The gaming device of claim 12, wherein the symbol positions associated with both of the winning symbol combinations are on the payline.

14. The gaming device of claim 11, which includes a plurality of paylines associated with the reels.

15. The gaming device of claim 14, wherein the winning symbol combinations occur at a plurality of the symbol positions on the paylines.

16. The gaming device of claim 11, wherein the winning symbol combinations are determined by at least one of: a random determination, a pre-determination and a determination based on a wager made by the player.

17. The gaming device of claim 11, wherein the symbols include at least one bonus symbol.

18. The gaming device of claim 17, which includes at least one bonus award provided to the player when a designated symbol combination including said bonus symbol occurs on the reels.

19. The gaming device of claim 18, wherein the bonus award is modified by at least one modifier.

20. The gaming device of claim 19, wherein the modifier includes a multiplier.

21. A method of operating a gaming device having a game operable upon a wager, the method comprising:
(a) activating a plurality of reels, each of the reels including a plurality of symbol positions, to generate at least one of a plurality of symbols at each of said plurality of symbol positions, wherein said plurality of symbols includes a plurality of first symbols, wherein at least two of the first symbols are different and at least one replicator symbol, wherein the replicator symbol includes at least two of the same symbols at one of the plurality of symbol positions;
(b) determining both if:
(i) a predetermined winning symbol combination of a plurality of winning symbol combinations is generated on the reels, wherein said predetermined winning symbol combination includes at least one of said plurality of first symbols and occurs in a predetermined number of symbol positions and
(ii) an additional winning symbol combination of said plurality of winning symbol combinations is generated on the reels, wherein said additional winning symbol combination includes the at least one replicator symbol and at least one of said plurality of first symbols and occurs in fewer symbol positions than said predetermined number of symbol positions, and wherein for said determination, each of the same symbols of the at least one replicator symbol simultaneously functions as an individual symbol; and
(c) displaying and providing a same award if either of said predetermined winning symbol combination and said additional winning symbol combination is generated.

22. The method of claim 21, wherein the step of providing the award to the player includes providing the award when either winning symbol combination occurs on a payline associated with the reels.

23. The method of claim 21, wherein the step of providing the award to the player includes providing the award when either winning symbol combination occurs in at least one symbol position on a plurality of paylines associated with the reels.

24. The method of claim 21, which includes the step of determining the winning symbol combinations by performing at least one of: a random determination, a pre-determination and a determination based on a wager made by the player.

25. The method of claim 21, which includes the step of providing at least one bonus award to the player when a winning symbol combination including at least one bonus symbol occurs on the reels.

26. The method of claim 25, wherein the bonus award is modified by at least one modifier.

27. The method of claim 26, wherein the modifier includes a multiplier.

28. The method of claim 21, wherein the steps are provided to the player through a data network.

29. The method of claim 28, wherein the data network is an internet.

* * * * *

UNITED STATES PATENT AND TRADEMARK OFFICE
CERTIFICATE OF CORRECTION

PATENT NO.       : 7,402,102 B2                                    Page 1 of 1
APPLICATION NO.  : 10/650247
DATED            : July 22, 2008
INVENTOR(S)      : Howard M. Marks et al.

It is certified that error appears in the above-identified patent and that said Letters Patent is hereby corrected as shown below:

ON THE TITLE PAGE, ITEM [75]:

In Inventors change "Howard Marks" to --Howard M. Marks--.

In Inventors change "Daniel Marks" to --Daniel M. Marks--.

In Claim 21, Column 18, Line 45 change "same symbols" to --same symbol--.

Signed and Sealed this

Eleventh Day of November, 2008

JON W. DUDAS
*Director of the United States Patent and Trademark Office*